United States Patent [19]

Presser et al.

[11] Patent Number: 4,636,350

[45] Date of Patent: Jan. 13, 1987

[54] PROCESS FOR THE CONTROL AND SHUTDOWN OF A GAS-COOLED REACTOR

[75] Inventors: Wolfgang Presser, Schwetzingen; Cornelia von Charzewski, Edingen-Neckarhausen, both of Fed. Rep. of Germany

[73] Assignee: Hochtemperatur-Reaktorbau GmbH, Cologne, Fed. Rep. of Germany

[21] Appl. No.: 648,627

[22] Filed: Sep. 10, 1984

Related U.S. Application Data

[63] Continuation of Ser. No. 327,076, Dec. 3, 1981, abandoned.

[30] Foreign Application Priority Data

Dec. 19, 1980 [DE] Fed. Rep. of Germany ....... 3047961

[51] Int. Cl.⁴ .............................................. G21C 7/06
[52] U.S. Cl. .................................. 376/226; 376/236; 376/237; 376/381
[58] Field of Search ................ 376/226, 237, 381, 236

[56] References Cited

U.S. PATENT DOCUMENTS

| | | | |
|---|---|---|---|
| 4,030,974 | 6/1977 | Neef | 376/381 |
| 4,148,685 | 4/1979 | Brandes | 376/381 |
| 4,152,204 | 5/1979 | Maly et al. | 376/381 |

*Primary Examiner*—Salvatore Cangialosi
*Attorney, Agent, or Firm*—Robert J. Koch

[57] ABSTRACT

Control regulation and shutdown of gas-cooled, high-temperature nuclear reactors require precise adjustment of core reactivity through the use of absorber rods. Fine adjustment without permanent damage to the reactor core having a bed of spherical fuel elements is accomplished by a process and arrangement of the reactor such that two groups of absorber rods are independently controlled for insertion into the reactor cavity between the roof reflector and the bed of spherical fuel elements and into the fuel element bed itself. Adjustments can be made for rapid shutdown and/or complete shutdown as well as rapid shutdown required due to water or oil penetration into the reactor core.

5 Claims, 3 Drawing Figures

PROCESS FOR THE CONTROL AND SHUTDOWN OF A GAS-COOLED REACTOR

This application is a continuation of application Ser. No. 327,076, filed Dec. 3, 1981, now abandoned.

BACKGROUND OF THE INVENTION

1. Field of the Invention

The invention relates to a gas-cooled high-temperature reactor having a bed or pile of spherical fuel elements and to a process for the control and shutdown of such reactor. More particularly, the invention concerns a gas-cooled high-temperature pebble-bed reactor having cooling gas flowing through the bed from top to bottom with the fuel elements reaching their state of final burnup desired after a single passage through the bed with roof, bottom and side reflectors surrounding the bed, wherein a cavity is provided between the roof reflector and the surface of the pile and with a plurality of absorber rods arranged in the roof reflector, the absorber rods being capable of insertion to a predetermined depth into the space enclosed by the reflectors for the control and shutdown of the high temperature reactor.

2. Background of the Art

Gas-cooled nuclear reactors having a core of a bed of spherical fuel elements equipped with core absorber rods and with absorber rods movable in the side reflector, designated hereinafter as reflector absorber rods, are known. An example of such reactor is the High Temperature Reactor THTR-300. In this type of reactor, for startup processes, i.e. for control processes for the reactivation of the reactor following shutdowns, the core absorber rods and the reflector rods are used. The reflector rods are provided for partial or rapid shutdowns and the core absorber rods for full or extended shutdowns. A partial or rapid shutdown of the reactor is defined as a measure whereby the reactor is rendered subcritical immediately by the rapid insertion of negative reactivity into the core of the reactor and maintained in this state for a short period of time (approximately 30 min.).

Reflector rods are used additionally for the compensation of excess reactivity in rapid load control processes.

In a further nuclear reactor with a bed of spehrical control elements, the installation for output control and for shutdowns consists of a part for shutdowns and a part for output control, wherein the part serving to shut down the nuclear reactor comprises absorber rods capable of being inserted in the bed and the part to control the output is formed by a plurality of plate like absorber elements displaceable within the wall of the roof reflector and within the cavity defined by the pile and the roof reflector and within the cavity defined by the pile and the roof reflector. One such device is described in West German Offenlegungsschrift No. 23 53 653, the disclosure of which is incorporated herein. This nuclear reactor utilizes the strong homogenizing effect of the cavity on the flux of neutrons. If the nuclear reactor is operated such that the fuel elements pass through the bed only once, the absorber elements for output control exhibit an especially high reactivity. A disadvantage of this known nuclear reactor is the fact that two separate arrangements are required for control and for shutdown.

The state-of-the-art further includes a nuclear reactor having a single passage of the spherical fuel elements controlled by means of absorber rods moving essentially within the roof reflector. This reactor is described in West German Offenlegungsschrift No. 21 23 894. The shutdown of this nuclear reactor is effected by means of special absorber rods inserted to approximately $\frac{1}{4}$ to $\frac{2}{3}$ of the height of the reactor core in the bed of fuel elements.

Two other nuclear reactors having a bed of spherical fuel elements passing only once through the reactor core have two shutdown systems that are independent of each other. A first shutdown system is used for full or extended shutdowns which are effected in these nuclear reactors by means of core absorber rods. The second shutdown system used for partial or rapid shutdowns may consist either of reflector rods as shown in West German Offenlegungsschrift No. 24 51 748 or of absorber rods moving in the roof reflector or in the cavity defined by the roof reflector and the bed of fuel elements as shown in U.S. Pat. No. 4,148,685, the disclosure of which is incorporated herein.

The nuclear reactor disclosed in U.S. Pat. No. 4,148,685 also displays a plurality of reflector rods, but here they are used to control the reactor. To increase the output from a partial load to a full load, selected absorber rods of the second shutdown system (i.e. rods moving in the roof reflector and the cavity) may also be used.

The nuclear reactor disclosed in West German Offenlegungsshrift No. 24 51 748 may also be operated with multiple passages of the fuel elements. In this case, reflector rods which are not part of the second shutdown system are performing the control function, wherein they may be assisted by several core absorber rods. If the nuclear reactor is charged with fuel elements in a single passage process, the load control of the nuclear reactor is effected by means of core absorber rods capable of absorbing the excess reactivity necessary for an adequate load cycle range (100-35-100%).

Because of the high reactivity effect of absorbing material in the cavity and in the roof reflector of nuclear reactors with a single passage of fuel elements, it is sufficient to move the core absorber rods as a bank within the roof reflector and in the upper part of the cavity. The insertion into the bed of fuel elements is normally not required. In this mode of operation the core absorber rods are, however, exposed to the high flux of thermal and fast neutrons existing in the cavity and the lower part of the roof reflector. Thermal neutrons activate n, $\alpha$ reactions in the nickel containing steels surrounding the absorbing material which, at temperatures exceeding 500° to 600° C., lead to the embrittlement of the steel. The tips of the absorber rods are particularly susceptible as there is no shading effect at this location of the absorbent material. The progressive embrittlement of the material during extended operating periods has a significant effect on the endurance of the absorber rods.

SUMMARY OF THE INVENTION

It is, therefore, an object of the present invention to provide a shutdown and control process for the above-described nuclear reactor whereby the exposure to radiation of the core absorber rods due to thermal and fast neutrons is reduced and the life of the rods extended.

This object is attained according to the invention by inserting only a portion of the core absorber rods into the cavity for controlling the load while the remaining core absorber rods are held in their upper terminal position in the roof reflector. Depending on the rate of exposure of the core absorber rods used for load control, the rods are replaced by core absorber rods held in their terminal position. The entirety of of core absorber rods are thereby used for shutdown processes only.

According to the process of the instant invention only a part of the nuclear absorber rods is exposed during control operations to the high flux of thermal neutrons, while the rest of the rods remain in the roof reflector and are, therefore, extensively protected (at least at the rod tips) against neutron radiation. By means of the interchange of inserted and retained core absorber rods, the mean radiation exposure of the entirety of the core absorber rods may be reduced and the harmful effect on the material of the core absorber rods is correspondingly reduced. This in turn leads to a substantial extension of the endurance of the rods.

In order to enable the number of core absorber rods inserted to bind the excess reactivity necessary for an adequate load cycle range, the rods are inserted to a somewhat greater depth into the cavity. The exact depths may be determined from the S curves of the core absorber rods. The effectiveness of the rods are a function of the depth of insertion. It is of advantage for the process according to the invention that the reactivity required for load cycle processes is reduced after extended operations with the increasing poisoning of the reactor core.

The process according to the invention utilizes the well known effect whereby during a single passage of the fuel elements the effectivenss of the absorbent material in the roof reflector and in the cavity underneath it is especially high. It is further of advantage to the invention that the average flux of thermal and fast neutrons in the cavity in the axial direction may be considered constant in a first approximation.

In a comparison to the known prior art nuclear reactor of this type, the process according to the invention has the advantage that no further apparatus is required for the control of reactor output in addition to the installation used for the shutdown of the reactor, i.e. the core absorber rods.

The portion of the core absorber rods used for output control may amount to approximately 25 to 50% of the total number of core absorber rods. With one-half of the rods inserted, the maximum flux of thermal neutrons in the area of the roof reflector is increased by approximately 10% with respect to the flux with all of the core absorber rods inserted. The core absorber rods retained in their upper terminal position (approximately 50 cm above the bottom edge of the roof reflector) receive with 50% of the rods inserted only approximately 50% of the-maximum neutron radiation. In the process, the flux of thermal neutrons is reduced to a lesser extent than the fast flux which is the result of the thermal "peak" in the roof reflector.

The effect obtained by the process according to the invention (i.e. the reduction of the radiation exposure of the core absorber rods) may be further improved by setting the upper terminal position of the core absorber rods in the roof reflector of a high temperature reactor controlled according to the invention as a function of the maximum thermal neutron flux. Thus, the maximum flux of thermal neutrons in the area of the core absorber rods inserted is reduced by another 25%, when with 50% of the rods inserted, the upper terminal position of the core absorber rods inserted is moved upwards by 50 cm, compared with the terminal position of the rods in a mode of operation, wherein all of the core absorber rods are inserted to control the reactor output. As shown by investigations, a reduction in the average thermal exposure of approximately 0.6 may be obtained by operating with one-half of the rods inserted to control the output, combined with an upward displacement of the upper terminal position of the rods by 50 cm.

The radiation exposure of the core absorber rods may also be reduced without changing the vertical positioning of the rods, by placing neutron absorbing materials in the wall of the roof reflector in the area of the core absorber rods inserted.

As mentioned hereinabove, during a rapid shutdown of a nuclear reactor with a pile of spherical fuel elements, the core must be made subcritical immediately by means of the rapid introduction of negative reactivity in the pile and it must be maintained in this state for approximately one-half hour. For a high temperature reactor of the above-described structural type, a concept for rapid shutdown is provided whereby all of the core absorber rods are inserted the same, predetermined depth in the pile. In a high temperature reactor controlled by the process of the invention, this raises the problem that two groups of core absorber rods, i.e. those of the partial number used to control the load and the group of rods remaining in their upper terminal position, must be brought to the same depth of insertion from different initial positions, i.e., it would be necessary to move the two groups with different strokes, thereby requiring complicated control means of the rods.

According to an advantageous further development of the process according to the invention, it is, therefore, proposed that for the purpose of a rapid shutdown only the partial number of core absorber rods used for output control and thus located in the cavity be inserted to a predetermined depth in thepile of fuel elements and that all of the core absorber rods be used and inserted in the pile of fuel elements for extended shutdowns only.

Calculations indicate that at the depths of relevance to a rapid shutdown, one-half of the core absorber rods already provides approximately 80% of the effect of the entirety of the rods. By choosing a somewhat larger insertion stroke for this group of core absorber rods, the reactivity required for a rapid shutdown can be obtained with this group.

The insertion of the second group of rods remaining in their upper terminal position may be effected manually in case of an extended shutdown. The core absorber rods used for rapid shutdowns which as the result of their use for output control may be at different heights depending on the operational state of the core are provided with a constant insertion stroke. The control of the rods is thereby simplified.

The employment of only a partial number of core absorber rods for load con-trol and rapid shutdowns results in the fact that these rods are occupying a normal position after an extended operation at a full load to bind the excess reactivity needed for load cycling that is approximately 30–40 cm deeper than in the case of the insertion of all of the core absorber rods. The rod tips may therein be located at approximately the height of the surface of the pile of fuel elements. The stroke for a rapid shutdown with a partial number of rods needs to be larger by approximately 30 cm only than the stroke required when all of the core absorber rods are inserted.

Operational conditions following a rapid shutdown are critical to the extent that therein at the tips of the core absorber rods, high temperatures are obtained. These high temperatures in combination with the material behavior of the rods used represent a limitation of the mode of insertion of the rods. The temperatures encountered will be permitted or designed to rise into the vicinity of what is acceptable at the present time.

In order to improve the limits of the reactor by extending the life of the core absorber rods, it is proposed in a further advantageous embodiment of the invention to use a mode of inserting the core absorber rods in the case of interference with reactivity caused by the penetration of water or oil for the rapid shutdown of the reactor, that is different from the mode of insertion of the rods normally used. In this manner, the normal insertion procedure may be significantly relieved and an insertion method reducing the exposure of the material achieved. Whether such a case of interference that should be treated separately is present may be ascertained by humidity measurements.

BRIEF DESCRIPTION OF THE DRAWINGS

The invention will become more apparent hereinafter from the two embodiments represented in the two figures.

DETAILED DESCRIPTION OF THE PREFERRED EMBODIMENTS

Figure 1:
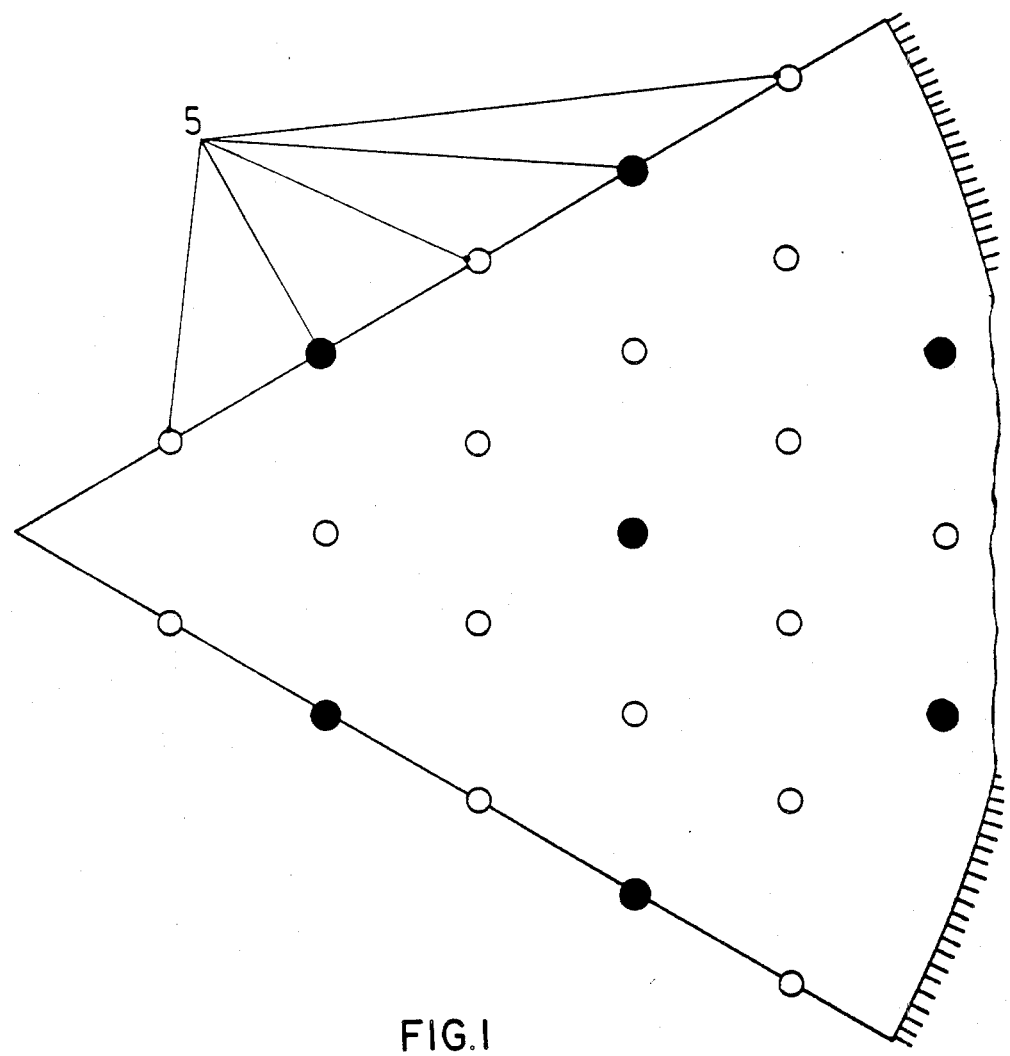
FIG. 1 represents a cross section of the grid area of rods in a high temperature reactor regulated according to the invention.

The high temperature reactor described in FIG. 1 comprises a core with a bed 1 of spherical fuel elements 2. This reactor has a capacity of 1637 Mw$_{th}$. The reactor is charged according to the principle of the single passage of the fuel elements. The bed 1, through which the cooling gas is flowing from top to bottom, is surrounded by a roof reflector 3 and a cylindrical side reflector (not shown), together with a bottom reflector. A cavity 4 is located between the roof reflector 3 and the surface of the bed 1.

The radius of the reactor core is 4.15 m. The roof reflector 3 has a thickness of 2 m and the cavity 4 has a height of 1 m. The spherical fuel elements have diameters of 6 cm; they contain on the average 10.343 g thorium and 10.285 g uranium with an enrichment of 93%. The filling factor of the bed 1 is 0.61.

The shutdown and control installation contains 108 core absorber rods 5, arranged in the roof reflector 3 and capable of direct insertion in the bed 1. The high temperature reactor further has 42 absorber rods that may be moved in the wall of the side reflector. The core absorber rods 5 may be retracted into an upper terminal position 6 in the roof reflector.

FIG. 1 shows a section of the rod grid of the 108 core absorber rods 5. To shut down the high temperature reactor, all of the rods 5 are inserted to a predetermined depth into the bed 1. For the control of the load, however, only a part of the core absorber rods 5 is inserted. The rods 5 forming the partial amount 5' at this point are indicated by black circles. The rest of the core absorber rods 5 located in their upper terminal position 6 constitute the group 5". In order to obtain a uniform exposure of all of the core absorber rods 5 following an extended period of operation, the rods belonging to groups 5' and 5" are mutually interchanged.

In the embodiment chosen, the partial number 5' is formed by 30 core absorber rods 5. They have an effectivity of 4.8% Δ K/K when inserted to the surface of the bed 1 of fuel elements (the entirety of all of the core absorber elements 5 would yield an effectivity of approximately 7% Δ K/K when inserted to the same depth). In contrast, the load cycle of 100%–35%–100% requires a reactivity of 3.9% Δ K/K and the load cycle of 100%–35% a reactivity of 2.6 Δ K/K. It is, therefore, sufficient for a load cycle to insert the 30 core absorber rods of the partial number 5' within the cavity 4.

According to calculations, the reactivity of 2.6% K/K required for a 100–35% load cycle is provided by the 30 core absorber rods of the partial amount 5' when the rods are inserted to a depth of 15 cm in the cavity 4 (measured from the lower edge of the roof reflector 3). The use of all of the 108 core absorber rods 5 for this load cycle process would result in a depth of insertion of 0 cm. The thermal neutron flux (E<1.9 eV) is approximately equal in both of the modes of insertion and amounts in the area of the rod tips to approximately $0.19 \times 10^{15}$ (1/cm$^2$ sec.).

A further comparison of the two modes of insertion shows that the control of loads by means of 30 core absorber rods 5 results in a thermal exposure per unit time of all of the rods that is approximately one-half of the exposure incurred in the mode of insertion using the bank of 108 rods. The comparison is even more favorable in relation to the exposure to fast neutrons. It is lower by an approximate factor of 3 per unit time for the method using 30 rods than with 108 rods.

A further advantage of the method using only 30 core absorber rods for load control is obtained in the determination of step dimensions for the method using 30 core absorber rods 5. As the maximum reactivity rise with the 30 rod bank is lower than with the 108 rod bank, the minimum step size may be correspondingly larger.

Figure 2:
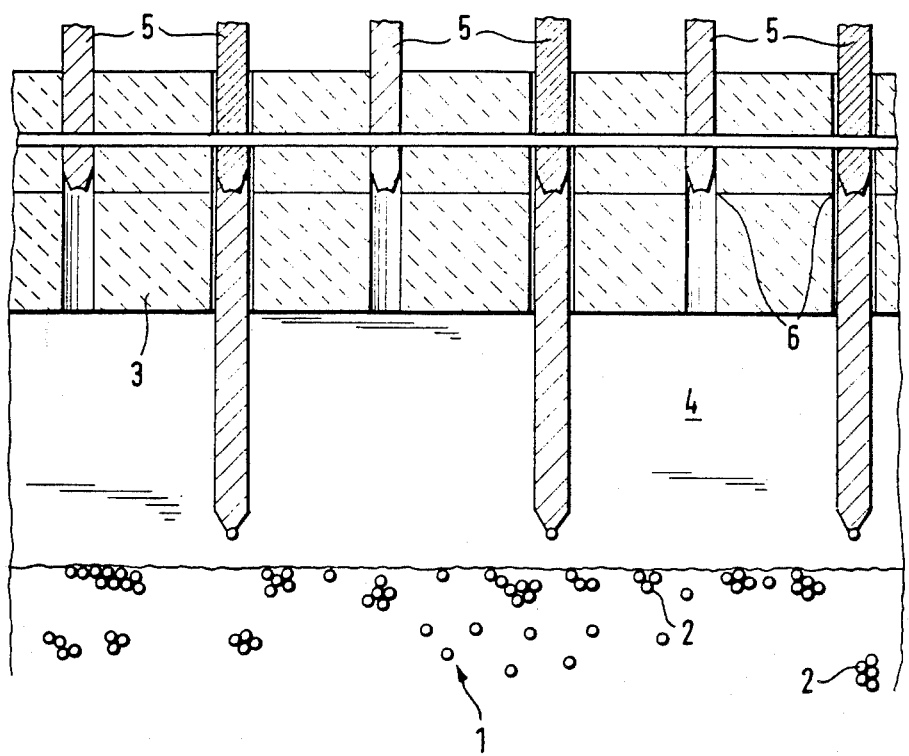
FIG. 2 illustrates a longitudinal cross section of the grid area of FIG. 1.
Figure 3:
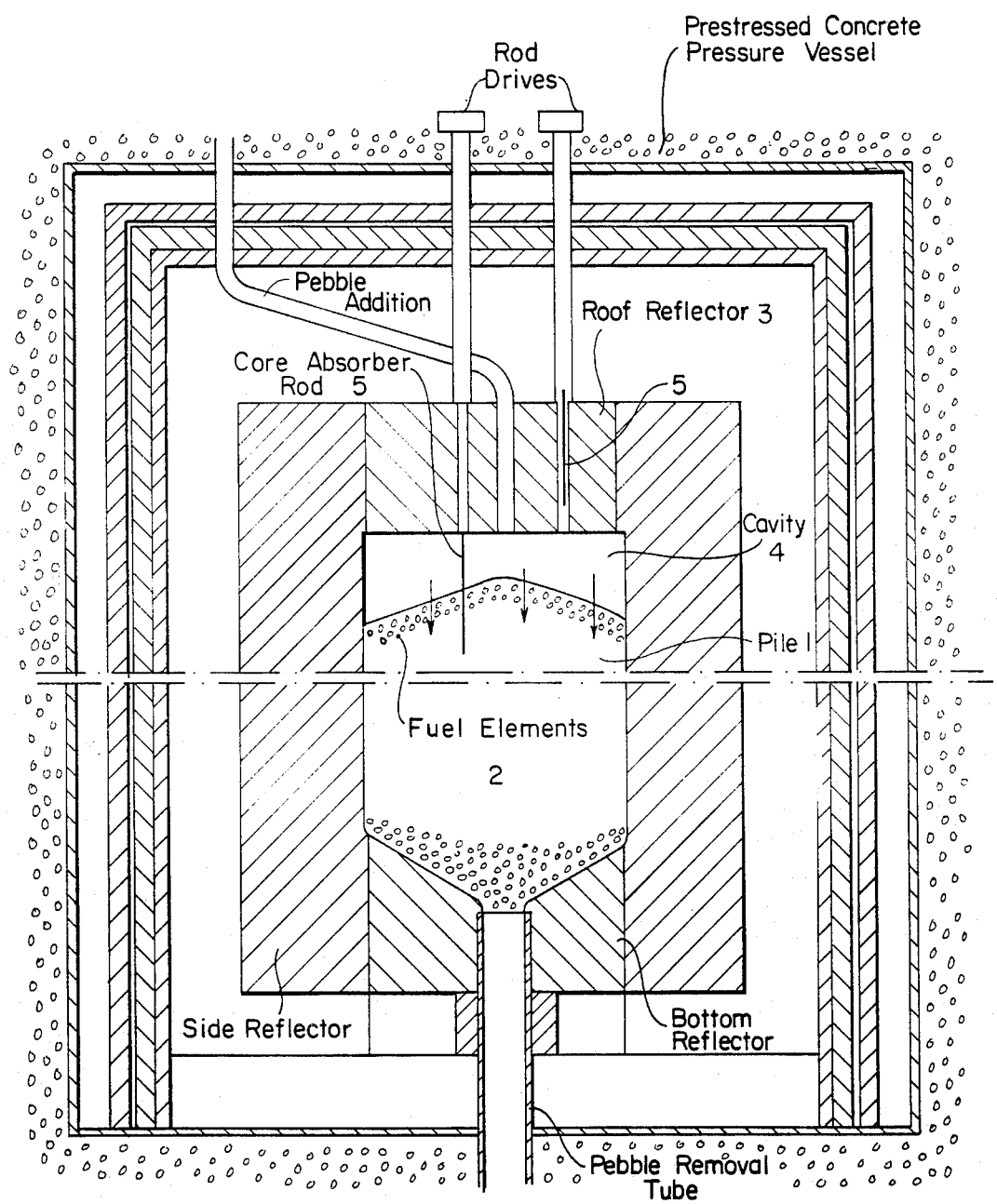
FIG. 3 illustrates the rapid shutdown of a high temperature reactor.

The second example as shown in FIG. 2 illustrates the rapid shutdown of a high temperature reactor with spherical fuel elements according to the invention. The reactor has a core radius of 4.87 m and a capacity of 2250 MW$_{th}$. The ceramic installations are similar to those of the reactor described in the first example. The roof reflector has a thickness of 2 m and the cavity a height of 1 m.

The shutdown and control apparatus includes 150 core absorber rods arranged in an ideal triangular grid in the roof reflector. Additionally, 48 reflector rods are available. These rods are moved in the wall of the side reflector and are in principle fully inserted in the case of a rapid shutdown.

In calculating the shutdown reactivity, initially a disturbance reactivity due to water penetration of 2.2 Δ K/K must be assumed. With consideration of the temperature equalization from a full load to zero load and of the cooling of the reactor core by approximately 300° including an uncertainty allowance of 10% and a minimum subcriticality of 0.5% Δ K/K, the maximum shutdown requirement is 6.0 Δ K/K.

The necessary rod effectivity amounts to 7.5% Δ K/K wherein the loss of the two most effective rods and a 10% uncertainty deduction is included. Of this rod effectivity, 0.8% Δ K/K is provided by the 48 reflector rods so that the core absorber rods are required to furnish additionally 6.7% Δ K/K.

If, as planned heretofore, all of the 150 core absorber rods are used for load control, the tips of these rods are located after an extended operation at a full load prior to a rapid shutdown at a depth of 60 cm in the cavity measured from the lower edge of the rod reflector. The shutdown insertion required is 175 cm. After the rapid shutdown, the tips of the rods are thus inserted to a depth of 135 cm in the fuel element bed. If one-half of the core absorber rods are used both for load control and rapid shutdown, the rods are inserted prior to the rapid shutdown to a depth of 100 cm in the cavity and thus are touching the surface of the bed. The shutdown insertion now requires amounts to 200 cm so that the rod tips are immersed after the rapid shutdown to a depth of 200 cm in the bed of fuel elements.

If as proposed hereinabove the disturbance reactivity required in the case of water penetration is provided by means of a special shutdown procedure, the requirement for a "normal" rapid shutdown is only 3.5% Δ K/K for which a rod effectivity of approximately 4.5% Δ K/K is necessary. If all 150 core absorber rods are used in a rapid shutdown, a shutdown insertion of 125 cm is needed so that the rod tips are inserted to a depth of 85 cm in the bed of fuel elements. An insertion of 119 cm is determined when using 75 core absorber rods and the depth of immersion of these rods in the bed thus amounts to 119 cm. In the case of a rapid shutdown with one-half of the core absorber rods, it is necessary to insert the latter only 34 cm deeper in the bed when all of the core absorber rods are used.

What is claimed is:

1. A process for alternate operational control, scram, and shutdown of a gas-cooled high-temperature nuclear reactor having a bed of spherical fuel elements, cooling gas flowing through said bed from top to bottom, the fuel elements achieving a desired final burn-up after a signal passage through the bed, said reactor also having a roof reflector, side reflector, and bottom reflector defining a reactor housing containing said bed, said roof reflector and a top surface of said bed defining therebetween a cavity within said reactor housing said reactor also having a plurality of absorber rods insertable from respective first positions in said roof reflector to respective second positions at a predetermined depth in said cavity and further to respective third positions at a predetermined depth in said bed, comprising the step of:
   inserting only rods comprising a predetermined number of said plurality of said absorber rods into said respective second positons a predetermined distance into said cavity when effecting operational control of power output, said predetermined number being less than the number of absorber rods in said plurality of absorber rods, the remainder of said plurality of absorber rods being maintained in said respective first positions in said roof reflector;
   exchanging each of said predetermined number of absorber rods in said respective second position with a respective absorber rod from said remainder by moving said each absorber rod from its second position to its first position and moving said respective absorber rod from its first position to its second position when said each absorber rod originally in its second positon has absorbed a predetermined amount of radiation;
   inserting said predetermined number of rods in said respective second positions into said respective third positions at a predetermined depth in said bed to effect a temporary scram as required; and
   inserting all of said plurality of absorber rods into said respective third positions to effect a long-term shutdown of said reactor as required.

2. A proecess as claimed in claim 1, wherein said predetermined number of absorber rods has a value in a range substantially from 25% to 50% of said number of absorber rods in said plurality of absorber rods.

3. A process as claimed in claim 1, wherein said respective third positions are sufficiently deep into said bed that the placement of said predetermined number of absorber rods into their respective third positions effects a Δ K/K of approximately 4.5%.

4. Apparatus for operational control, scram and shutdown of a gas-cooled high-temperature nuclear reactor having a bed of spherical fuel elements, cooling gas flowing through said bed from top to bottom, the fuel elements achieving a desired final burn-up after a single passage through said bed, said reactor also having a roof reflector, side reflector, and bottom reflector defining a reactor housing containing said bed, said roof reflector and a top surface of said bed defining therebetween a cavity within said reactor housing, said reactor also having a plurality of absorber rods insertable from respective first positions in said roof reflector to respective second positons at a predetermined depth in said cavity and further to respective third positions at a predetermined depth in said bed comprising:
   means for inserting only a predetermined number of said plurality of absorber rods into said respective second positions a predetermined distance into said cavity when effecting operational control of power output, said predetermined number being less than the number of absorber rods in said plurality of absorber rods, the remainder of said plurality of absorber rods being maintained in said respective first positions;
   means for exchanging each of said absorber rods in said respective second positions in said cavity with a respective absorber rod in said respective first position in said roof reflector by moving said each absorber rod from its second position into its first position and moving said respective absorber rod from its first position into its second position when said each absorber rod originally in its second position has absorbed a predetermined amount of radiation;
   means for inserting absorber rods in respective second positions in said cavity into respective third positions in said bed to effect a temporary scram as required; and
   means for inserting all of said plurality of absorber rods into respective third positions to effect a long-term shutdown as required.

5. An apparatus as in claim 4, further comprising neutron absorbing material within a wall of the roof reflector member in the vicinity of an upper terminal position of said predetermined number of said plurality of absorber rods.

* * * * *